United States Patent Office 3,004,038
Patented Oct. 10, 1961

3,004,038
SUBSTITUTED PHTHALIDE DIISOCYANATES
William B. Hardy and Frederic H. Adams, Bound Brook, N.J., assignors to American Cyanamid Company, New York, N.Y., a corporation of Maine
No Drawing. Filed June 23, 1958, Ser. No. 744,020
6 Claims. (Cl. 260—343.4)

This invention relates to bis-isocyanato compounds represented by the following formulae:

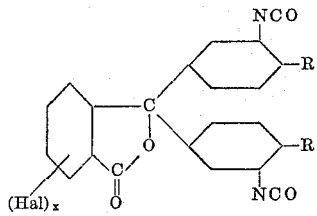

and

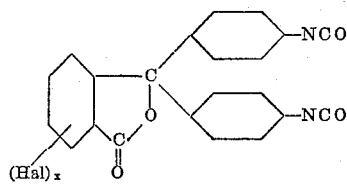

"Hal" is a halogen such as chlorine, "$x$" is from 0 to 4, and R is halogen or lower alkyl. The new compounds are useful as tire cord bonding agents.

It will be noted that in the case of the unsubstituted isocyanato phenyl compound, the isocyanate group is in the para position, whereas in the case of the homologs, it is in the meta position. In each case, however, it is possible to prepare the compounds by the same general process, namely, the reaction of the corresponding amino compounds with phosgene. The reaction will be illustrated generally for the isocyanato tolyl derivative by the following equation:

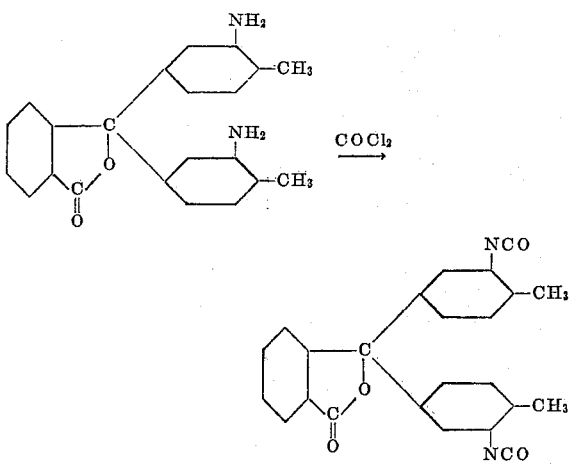

While the reaction with phosgene, preferably in solution in inert organic solvents such as chlorobenzene, orthodichlorobenzene or mixtures, is a very simple and economical method of producing the compounds and is included in a specific aspect of the present invention, it should be understood that the new compounds are not limited to any particular method of production. In many cases, the corresponding amino compounds are known chemical compounds. However, in a few cases, they are new compounds and are included in the present invention, although, of course, being in no sense equivalents of the isocyanato compounds.

In the case of the isocyanato compounds of bis-para-alkyl-phenyl phthalides, a single compound results. However, in the case of the para-isocyanato-phenyl-phthalides, there will usually be a mixture of isomers. The corresponding amino compound is normally made by nitrating bis-phenyl phthalide. The nitro group predominantly enters the para position, but small amounts of isomers result, and, of course, on reduction, the corresponding amino compound also represented in the mixture, in which the predominant component is the para compound. After transforming the amino group into an isocyanato group, the resulting products are also mixtures. In the specification and claims, the predominant para isomer is shown, although this product is not obtained with complete purity. The invention will be described in greater detail in conjunction with the following specific examples in which the parts are by weight unless otherwise specified.

Example 1

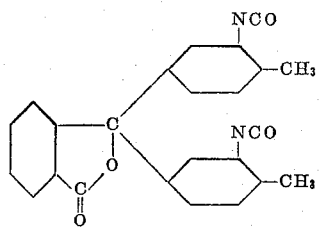

100 parts of phosgene is added at 70° C. to 1252 parts of a dry 2:1 mixture of o-dichlorobenzene and chlorobenzene. The addition is by gradual bubbling of the gas into the liquid. To the phosgene solution is then added 150 parts of 3,3-bis-(3-amino-4-methylphenyl)-phthalide dissolved in 2510 parts of the same o-dichlorobenzene-chlorobenzene mixture. After the addition is complete, 180 parts of phosgene is gradually bubbled into the mixture and the temperature slowly increased to 122° C., being maintained at this point until the reaction is substantially complete. Any excess phosgene is purged with nitrogen and on standing, a solid product separates out which is removed by filtration and freed of solvent by distillation under a vacuum.

Example 2

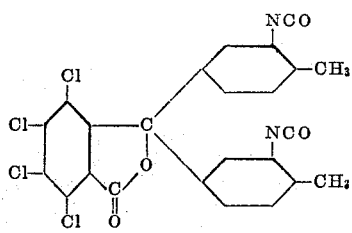

One mol of 2-(p-toluyl)tetrachlorobenzoic acid is dissolved in 20 mols of concentrated sulfuric acid. To the solution is then added 3.8 mols of toluene and the temperature permitted to rise to 30° C. After the reaction is complete, the reaction mixture is cooled to 10° C. and an additional amount of toluene added to bring out the total addition to 4.5 mols. The temperature is allowed to rise to room temperature until the reaction is complete and the mixture then drowned in about four times its weight of cracked ice and water. A solid product is obtained which is recovered by filtering and washed free of acid.

45.2 parts of the product is dissolved in 184 parts of concentrated sulfuric acid at −19° C. There is then added gradually 14.8 parts of 81% nitric acid and 54 parts of concentrated sulfuric acid. The temperature is allowed to rise to 0° C. and then an additional 1.4 parts of nitric acid and 2.2 parts of concentrated sulfuric acid are added. The temperature is then allowed to rise to room temperature and is maintained until reaction is complete and then is drowned in about 1000 parts of ice and water. It is also washed free of acid. 240 parts of the product are dissolved in 1860 parts of glacial acetic acid, the solution being formed at 60° C. with stirring. Thereupon, 571 parts of concentrated hydrochloric acid and 642 parts of stannous chloride is added slowly, the temperature rising to 90° C. The mixture is then heated at reflux until reaction is complete and then 1300 parts of acetic acid are distilled off by reduced pressure. The reaction mixture is made alkaline with sodium hydroxide, then 847 parts of a 20% aqueous sodium carbonate solution is added. To the alkaline solution there is added a yellow ammonium polysulfide obtained by saturating 1909 parts of 29% ammonium hydroxide and 217 parts of powdered sulfur. The mixture is stirred until reaction is complete, and a solid product results which is the corresponding amino compound and is removed by filtration and washed with water and dried.

The product is reacted with phosgene as described in Example 1, using equivalent amounts of phosgene. The resulting product has the above formula.

*Example 3*

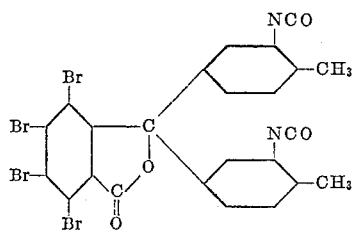

The procedure of Example 2 is repeated, replacing the para-toluyl tetrachlorobenzoic acid with a corresponding amount of the tetrabromo acid. The corresponding tetrabromo compound is produced.

When the procedure is repeated with tetraiodo-para-toluyl benzoic acid, the corresponding tetraiodo product is obtained.

*Example 4*

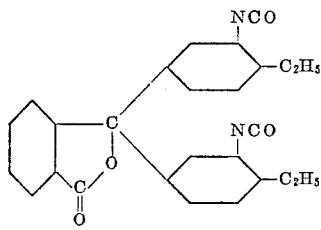

The procedure of Example 3 is repeated, using the corresponding amount of the ortho-(para-ethylbenzoyl) benzoic acid instead of the tetrachloro acid of Example 2. The product of the above formula is obtained in good yield and purity.

*Example 5*

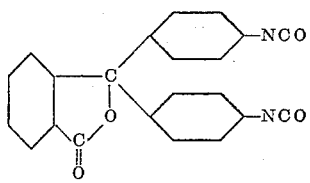

Phosgene is passed into 260 parts o-dichlorobenzene cooled to 0° C. until a total of 117 parts has been introduced. To the cold phosgene solution there is then added a hot solution of 31.6 parts of 3,3-bis-(p-aminophenyl)-phthalide dissolved in 520 parts of o-dichlorobenzene. The rate of addition of the hot solution is such that the temperature of the reaction mixture does not rise above 2° C. Good stirring is maintained throughout the addition and is then continued until the mixture gradually warms up to room temperature. Further phosgene gas is then bubbled in and the mixture heated until the temperature reaches about 130° C. Heating is then stopped and the mixture stirred until no more hydrogen chloride is given off. The mixture is then purged with nitrogen and the solvent removed by distillation under a vacuum, leaving a crystalline product, the predominant component of which has the above formula. It is associated with relatively small amounts of isomers resulting from the fact that the initial raw material is prepared by nitrating 3,3-bis-phenyl phthalide and then reducing. The major portion of the nitro groups go in the para position as is shown in the formula with minor amounts of isomers formed. These isomers proceed through the reaction and are transformed into isocyanato groups.

*Example 6*

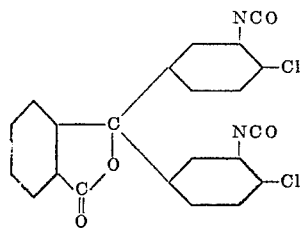

The procedure of Example 2 is repeated, replacing the para-toluyl tetrachlorobenzoic acid with a corresponding amount of 2-(p-chlorobenzoyl) benzoic acid. A good yield of the product resulted having the formula set out above.

*Example 7*

6.3 parts of the product of Example 1 is incorporated in 100 parts of a 10% rubber-and-toluene cement. Nylon tire cord is then treated with three coats of the resulting compound and the treated cord cured into a natural rubber tire carcass stock. As a control, a piece of cord was treated in the same way, using a cement which has none of the compound of Example 1. The cords were then pulled out and the adhesion measured. The control, that is to say, the cord with none of the product of Example 1, showed an adhesion of 250 grams, whereas the cord cemented with the cement having the product incorporated showed an adhesion of 459 grams or an improvement of 84% in adhesion.

We claim:

1. A compound selected from the group consisting of compounds of the formulae:

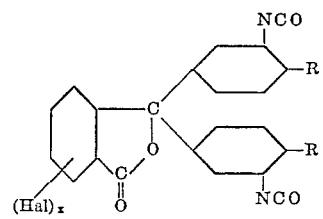

and

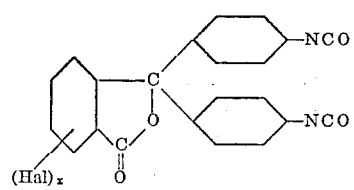

in which "Hal" is selected from the group consisting of bromine, chlorine and iodine, "$x$" is an integer of from 0 to 4, and R is selected from a group consisting of bromine, chlorine and the lower alkyl radicals.

2. A compound of the formula:

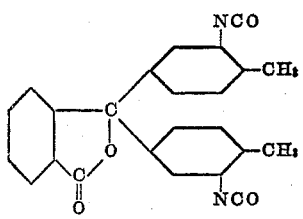

3. A compound of the formula:

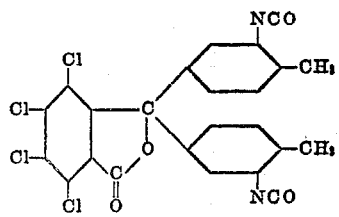

4. A compound of the formula:

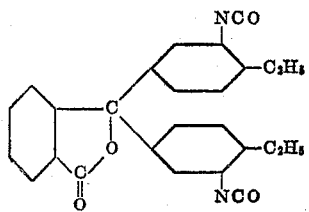

5. A compound of the formula:

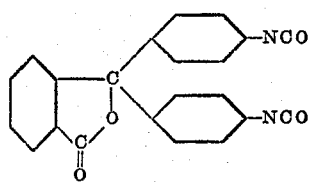

6. A compound of the formula:

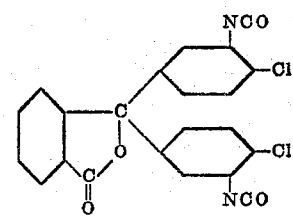

References Cited in the file of this patent

Karrer: Organic Chemistry, Elsevier, N.Y. (1938), p. 204.

Simons (Ed.): Fluorine Chemistry, Academic Press, N.Y. (1950), page 402.

Fieser et al.: Organic Chemistry, Reinhold, N.Y. (1956), page 232.